United States Patent [19]

Gobeli

[11] Patent Number: 4,932,768
[45] Date of Patent: Jun. 12, 1990

[54] ASPHERIC MIRROR PRODUCED BY THE ELASTIC DEFORMATION OF A SPHERICAL MIRROR

[75] Inventor: Garth W. Gobeli, Albuquerque, N. Mex.

[73] Assignee: Chromex, Inc., Albuquerque, N. Mex.

[21] Appl. No.: 385,311

[22] Filed: Jul. 25, 1989

[51] Int. Cl.$^5$ .............................................. G02B 5/10
[52] U.S. Cl. .................................. 350/611; 350/629; 350/630
[58] Field of Search ............... 350/607, 609, 611, 629, 350/630, 162.17; 356/302, 303, 304, 305

[56] References Cited

U.S. PATENT DOCUMENTS

| | | | |
|---|---|---|---|
| 3,575,511 | 4/1971 | Francis | 356/99 |
| 4,043,644 | 8/1977 | Humphrey | 350/295 |
| 4,119,366 | 10/1978 | Lemaitre | 350/295 |
| 4,553,253 | 11/1985 | Peterson | 378/084 |
| 4,734,557 | 3/1988 | Alfille et al. | 350/611 |

FOREIGN PATENT DOCUMENTS 0209449  1/1987  France .
400445  10/1933  United Kingdom .

Primary Examiner—Bruce Y. Arnold
Assistant Examiner—J. P. Ryan
Attorney, Agent, or Firm—Cahill, Sutton & Thomas

[57] ABSTRACT

An aspheric mirror in the form of a toric mirror includes a first element having a front surface which defines a spherical reflector and a spaced apart rear surface. The spherical reflector includes a constant radius of curvature, an X-axis with an X-axis radius of curvature and a Y-axis with a Y-axis radius of curvature. The first element possesses a first rigidity factor. A second element includes a front surface sized to mate with the rear surface of the first element along an interface zone. The second element possesses a second rigidity factor. An interface contour device produces a differential cylindrical contour within the interface zone between the first and second elements. The interface contour device is aligned to modify the X-axis radius of curvature of the spherical reflector without significantly modifying the Y-axis radius of curvature. A compression device compresses the first and second elements together to deflect the first element relative to the second element to modify the X-axis radius of curvature without substantially modifying its Y-axis radius of curvature to produce a toric mirror.

48 Claims, 4 Drawing Sheets

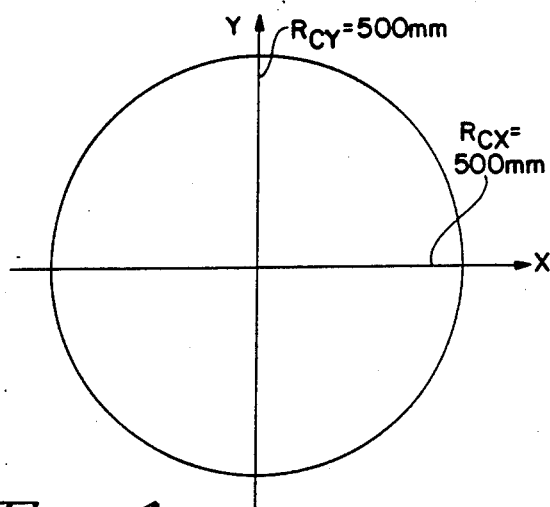
FIG. 1
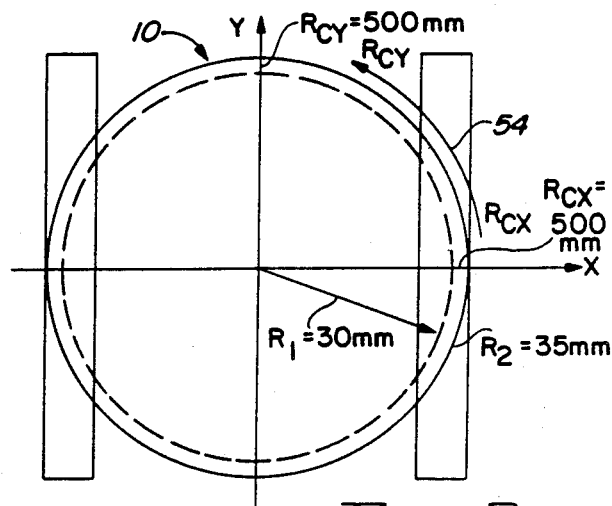
FIG. 2
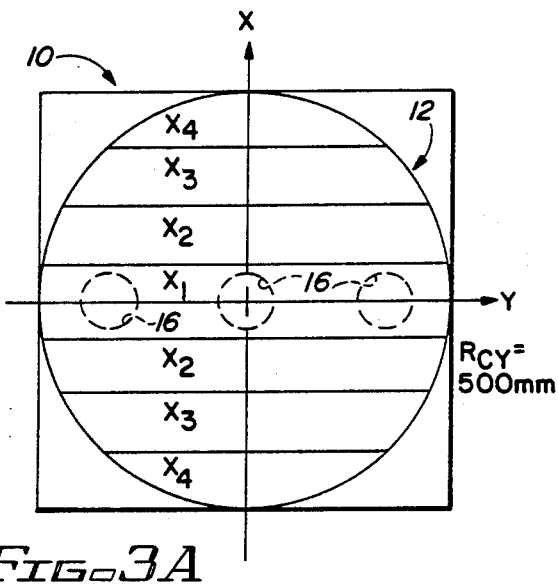
FIG. 3A
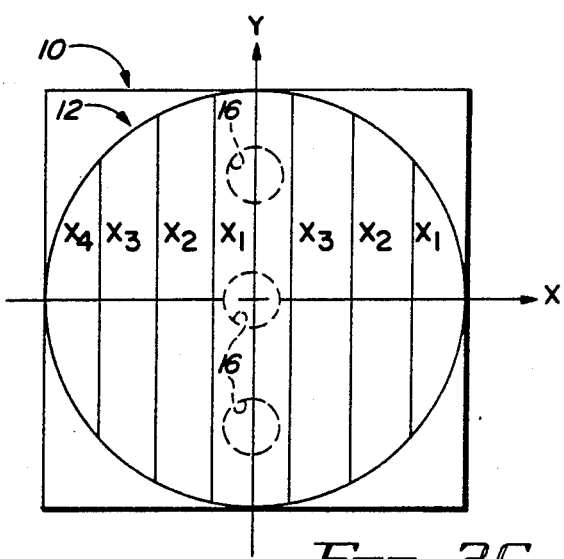
FIG. 3C
FIG. 3B
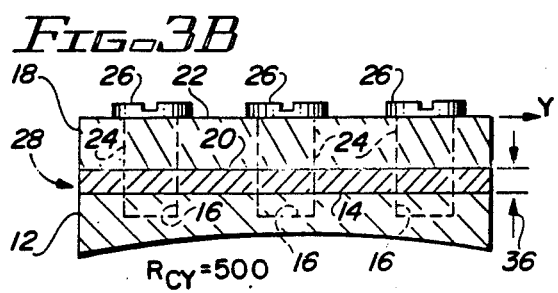
FIG. 3D
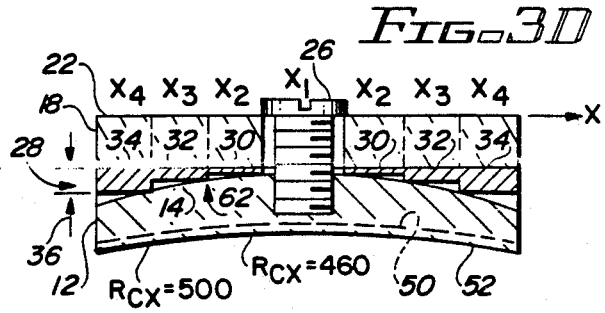
FIG. 3E
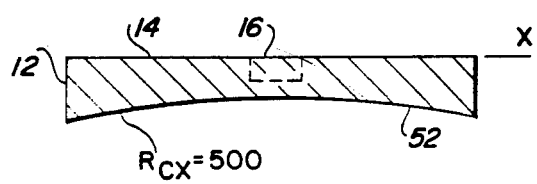
FIG. 3F
$R_S = 42.5$ mm:
$S(X_1) = 0$
$S(X_2) = .001''$
$S(X_3) = .002''$
$S(X_4) = .003''$

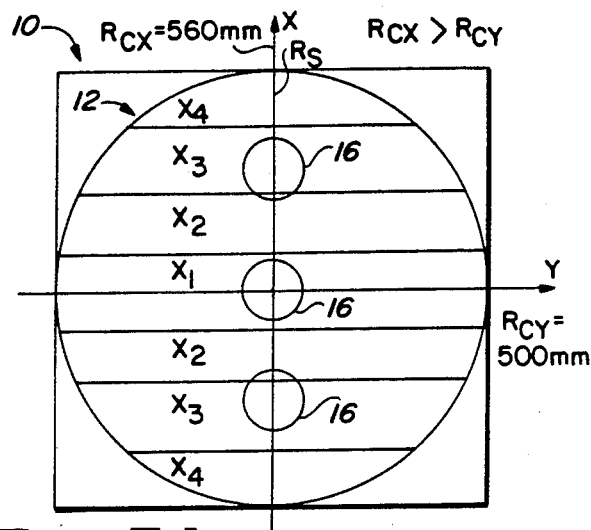
FIG. 5A
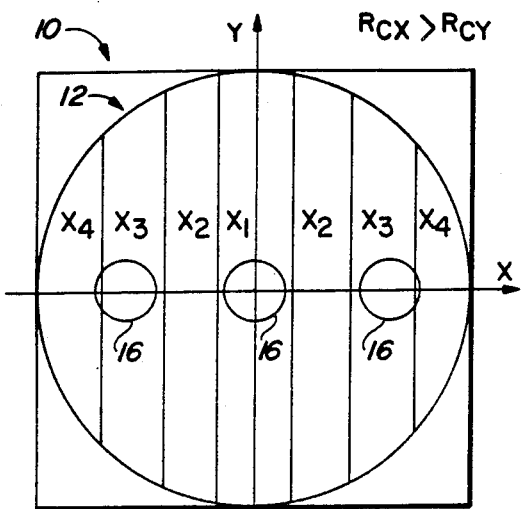
FIG. 5C
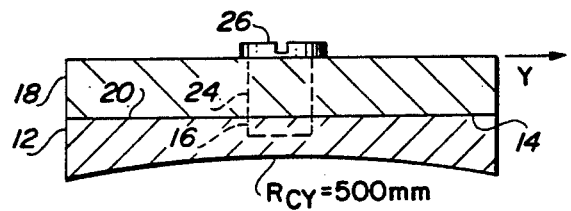
FIG. 5B
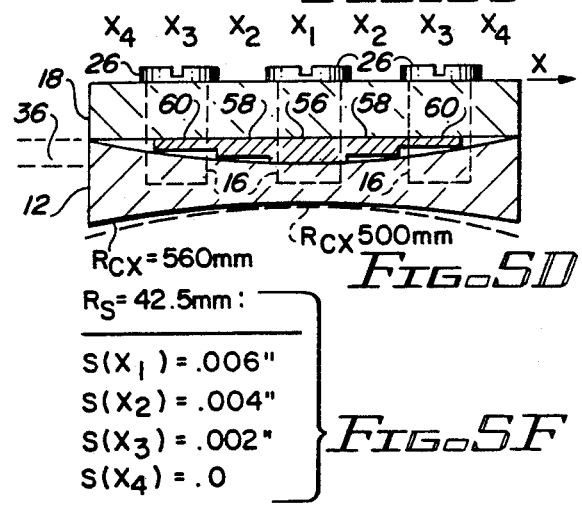
FIG. 5D
$R_S = 42.5mm$
$S(X_1) = .006"$
$S(X_2) = .004"$
$S(X_3) = .002"$
$S(X_4) = .0$
FIG. 5F
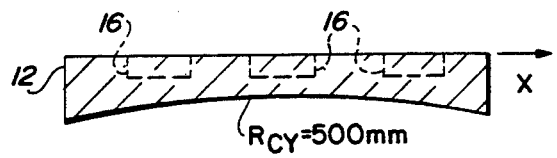
FIG. 5E
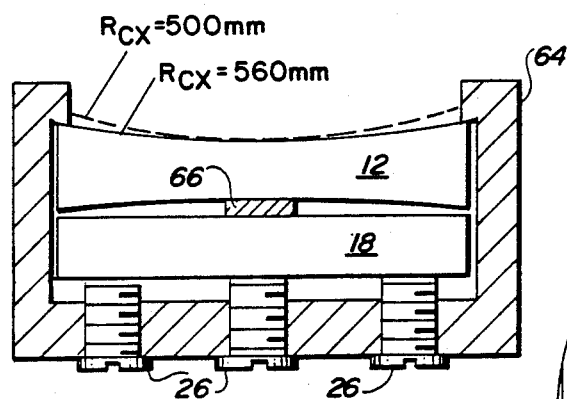
FIG. 6A
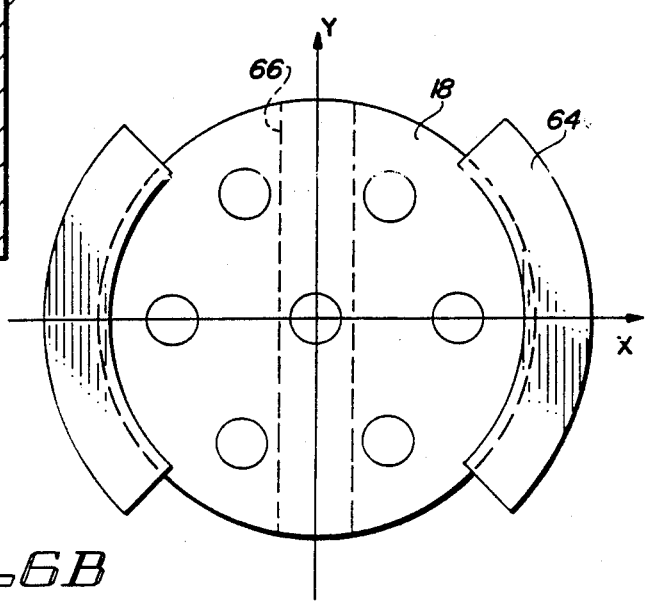
FIG. 6B

ASPHERIC MIRROR PRODUCED BY THE ELASTIC DEFORMATION OF A SPHERICAL MIRROR

BACKGROUND OF THE INVENTION

1. Field of the Invention

The present invention relates to off-axis reflective mirrors, and more particularly to aspheric mirrors produced by the elastic deformation of a spheric mirror.

2. Description of the Prior Art

Conventional spherical mirrors are usually produced by grinding and lapping of glass or other suitable substrates. Non-spherical or off-axis mirror sections are difficult and expensive to fabricate. Mirrors or reflectors having toric sections represent the most difficult mirrors to fabricate and use due to the lack of an axis of rotational symmetry.

Optical replication techniques have reduced the difficulty of producing non-spherical optical elements since replication techniques require the production of only a single high quality master by polishing and lapping techniques. The master may then be then replicated at substantially reduced cost and in large quantity.

A toric mirror or reflector is defined as a reflector having two mutually perpendicular cylindrical surfaces with an X-axis radius of curvature $R_X$ and an orthogonal Y-axis radius of curvature $R_Y$. A toric mirror surface is derived from the additive or subtractive combination of a spherical surface having a base radius of curvature $R_C$, where the cylindrical additive or subtractive differential radius lies along the X-axis and modifies the X-axis radius of curvature $R_{CX}$.

Any toric mirror can be completely defined by the parameters $R_{CX}$ and $R_{CY}$, where $R_{CX}$ represents the radius of curvature along the X-axis and $R_{CY}$ represents the radius of curvature along the Y-axis. One of these two parameters, typically $R_{CY}$, represents the base radius of curvature $R_C$ of the spherical component of the toric mirror while the second parameters, typically $R_{CX}$, represents the modified radius of curvature which results from the cylindrical additive or subtractive component superimposed on the underlying spherical surface.

Using existing mirror fabrication techniques, it has been very difficult to fabricate an extremely high tolerance toric mirror surface at a cost enabling use in a mass produced product.

SUMMARY OF THE INVENTION

It is therefore a primary object of the present invention to provide a toric mirror which can be mass produced with extremely high accuracy at low cost.

Another object of the present invention is to provide a toric mirror which can be mass produced with substantially greater accuracy and at a substantially lower cost than has been possible utilizing any prior art toric mirror fabrication technique.

Another object of the present invention is to provide a toric mirror which can be mass produced to create a highly accurate toric mirror surface even for use at large off-axis angles.

Another object of the present invention is to provide a toric mirror produced by the controlled, elastic deformation of a mass produced spherical mirror.

Another object of the present invention is to provide a toric mirror resulting from the controlled deformation of a spherical mirror by means of a shimming surface placed between the rear surface of a spherical mirror and the front surface of an adjacent element.

Still another object of the present invention is to provide a mirror for use in monochromators or spectrographs for the purpose of field flattening and astigmatism/aberration correction.

Still another object of the present invention is to provide a toric mirror formed by the addition or subtraction of a precisely controlled amount of cylindrical curvature to a spherical mirror.

Briefly stated, and in accord with one embodiment of the invention, a toric mirror comprises a first element having a front surface defining a spherical reflector and a spaced apart rear surface. The spherical reflector includes a constant radius of curvature, an X-axis with an X-axis radius of curvature and a Y-axis with a Y-axis radius of curvature. The first element is fabricated to possess a first rigidity factor. A second element includes a front surface sized to mate with the rear surface of the first element along an interface zone. The second element is fabricated to possess a second rigidity factor. Interface contour means produces a differential cylindrical contour within the interface zone between the first and second elements. The interface contour means is aligned to modify the X-axis radius of curvature of the spherical reflector without substantially modifying the Y-axis radius of curvature. Compression means compresses the first and second elements together to deflect the first element relative to the second element to modify the X-axis radius of curvature of the spherical reflector without substantially modifying its Y-axis radius of curvature. The foregoing structure results in a toric mirror having a modified X-axis radius of curvature determined by the interface contour means and a substantially unchanged Y-axis radius of curvature.

DESCRIPTION OF THE DRAWINGS

The invention is pointed out with particularity in the appended claims. However, other objects and advantages together with the operation of the invention may be better understood by reference to the following detailed description taken in connection with the following illustrations, wherein:

FIG. 1 represents a simplified, two dimensional diagram of a conventional spherical reflector where $R_{CX}$ is equal to $R_{CY}$.

FIG. 2 represents a simplified two dimensional illustration showing the manner in which a spherical lens can be deformed by an additive differential cylindrical component along the X-axis.

FIGS. 3A–3F represent a series of two dimensional views of a single preferred embodiment of the present invention showing the manner in which the shimming surface formed from a plurality of discrete shims can be used in combination with a spherical reflector to produce a toric mirror where the X-axis radius of curvature $R_{CX}$ is less than the Y-axis radius of curvature $R_{CY}$.

FIGS. 5A–5F represent a series of two dimensional views of a single preferred embodiment of the present invention showing the manner in which the shimming surface formed from a plurality of discrete shims can be used in combination with a spherical reflector to produce a toric mirror where the X-axis radius of curvature $R_{CX}$ is greater than the Y-axis radius of curvature $R_{CY}$.

FIGS. 6A-6B illustrates another embodiment of the invention where a compression device in the form of an external frame is used to deflect the X-axis radius of curvature of a spherical reflector.

DESCRIPTION OF THE PREFERRED EMBODIMENT

In order to better illustrate the advantages of the invention and its contributions to the art, a preferred hardware embodiment of the invention will now be described in some detail.

FIG. 1 represents a two dimensional elevational view of a conventional spherical reflector having a uniform base radius of curvature $R_{CX}$. In FIG. 1, $R_C$ is assumed to be equal to 500 mm. Therefore both $R_{CX}$ and $R_{CY}$ also equal 500 mm.

Figure 4:
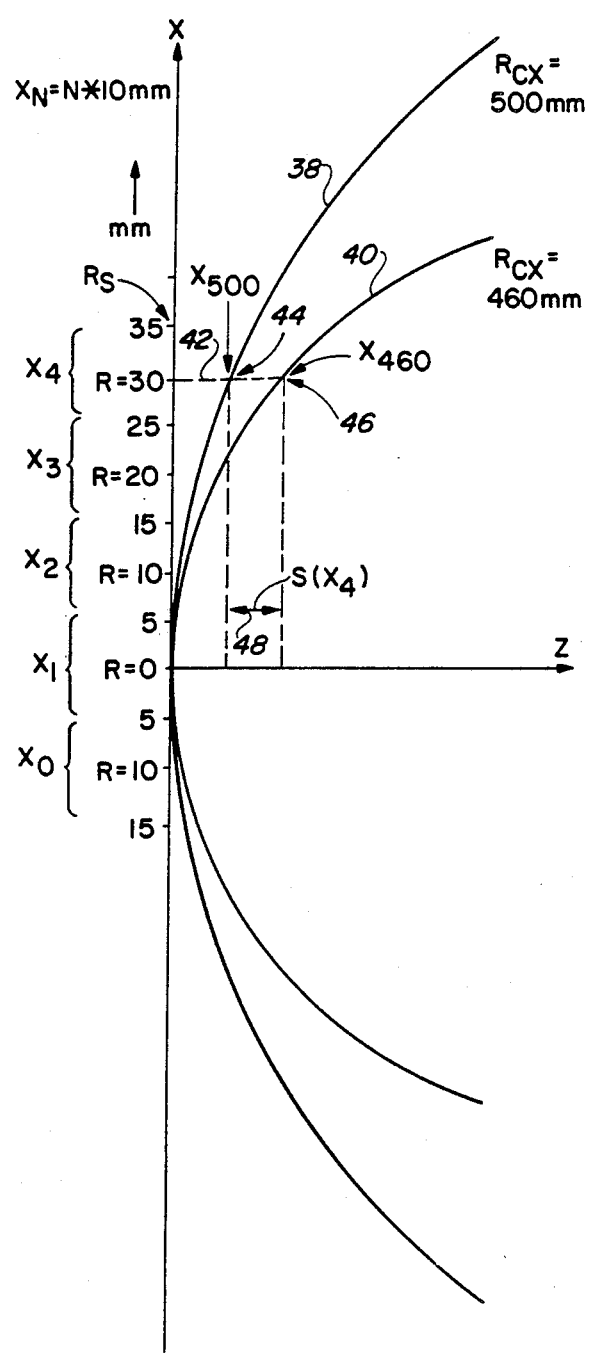
FIG. 4 represents a graphical illustration demonstrating the manner in which the shim dimensions relating to the FIG. 2 and FIG. 3 embodiments of the invention may be computed.

Referring now to FIGS. 2, 3 and 4, a spherical reflector 10 produced by high accuracy replication techniques includes a base radius of curvature $R_C=500$ mm. To produce a toric mirror having parameters $R_{CX}=460$ mm and $R_{CY}=500$ mm, a series of measurements and computations must be accomplished to determine the structure of the various elements of the present invention required to accomplish this result.

FIG. 3 represents one preferred embodiment of the invention which includes a first element which takes the form of the replicated spherical reflector having a base radius of curvature of $R_C=500$ mm. In this embodiment of the invention, the spherical reflector is formed on a first element aluminum substrate 12 which possesses a first rigidity factor. As illustrated in FIGS. 3B-3E, the rear surface 14 of first element 12 represents a flat or planar surface. In one embodiment of the invention, the height or depth of first element 12 is selected to be equal to one half inch and a series of three drilled and tapped one quarter inch deep apertures 16 are formed at spaced apart intervals along the Y-axis of first element 12.

The toric mirror of the present invention also includes a second element 18 which in the FIG. 3 embodiment includes a planar front surface 20, a planar rear surface 22 and a thickness of one half inch to equal the thickness of first element 12. In this specific embodiment of the invention, second element 18 is fabricated from steel which possesses a second rigidity factor substantially greater than the first rigidity factor of the aluminum utilized in the fabrication of the first element 12. Steel typically has a specific rigidity factor approximately three and one half times greater than the specific rigidity factor of aluminum.

Second element 18 also includes a series of three spaced apart apertures 24 which are dimensioned to precisely mate with the apertures 16 in first element 12. A plurality of threaded screws 26 serve as compression means of the present invention to compress the first element 12 and second element 18 together.

Interface contour means 28 in the FIG. 3 embodiment of the invention takes the form of a plurality of specially configured shims, such as shims 30, 32 and 34 which are inserted within an interface zone 36 between first element 12 and second element 18.

Referring now to FIG. 4, the method of determining a specific contour for interface contour means 28 for the FIG. 3 toric mirror will now be described in detail. As designated in FIG. 3A, a toric mirror having parameters $R_{CX}=460$ mm and $R_{CY}=500$ mm has been selected for the purpose of discussion.

As illustrated by FIG. 4, an accurate, scaled graphic representation with respect to the X and Z axes is first drawn for the selected two spheric surfaces where one spheric surface has a X-axis radius of curvature $R_{CX}=460$ mm and the second spheric surface has an X-axis radius of curvature $R_{CX}=500$ mm. These two curves are designated in FIG. 4 by reference numbers 38 and 40 and correspond to the desired FIG. 3A toric reflector parameters of $R_{CX}=460$ mm and $R_{CY}=500$ mm. The purpose of curves 38 and 40 is to facilitate the determination of the shim width and thickness dimensions.

As illustrated in FIGS. 3A and 4, the reflective surface of first element 12 is first divided into a group of equal width segments along the X-axis. In this case, X-axis segment widths of 10 mm each have been selected and each segment is identified by one of the following segment designators: $X_1$, $X_2$, $X_3$ and $X_4$.

If, as illustrated in FIGS. 2 and 4, the radial distance from the center of the reflective surface of first element 12 to its outer edge is selected as $r=35$ mm and the width of each shim is selected to equal 10 mm, the height or thickness of each rectangular cross section shim can now be readily measured directly on the FIG. 4 graph.

Since it is desired to maintain the Y-axis radius of curvature $R_{CY}$ equal to the 500 mm radius of curvature of the undistorted spherical reflector, the thickness of the centermost shim which will be placed within shim zone $X_1$ will be equal to zero, that is no shim will be placed within this central shim zone. This specific relationship can be visualized by reference to the interface between first element 12 and second element 18 within shim zone $X_1$ as illustrated in FIG. 3D and alternatively by noting in FIG. 4 that within shim zone $X_1$ curves 38 and 40 are superimposed on each other at radial distance $r=0$.

By referring to FIGS. 2 and 4, the method of computing the thickness of the outermost shim 34 which will be placed within shim zone $X_4$ will now be explained in detail. The 10 mm wide shim zone $X_4$ extends from a radial distance $r=25$ mm to a radial distance $r=35$ mm.

At the center of shim zone $X_4$ where $r=30$, a horizontal line 42 is drawn parallel to the Z-axis to intersect both curves 38 and 40 at points 44 and 46. The height or thickness of shim 34 is therefore represented by dimension line 48 which corresponds to the differential distance between points 44 and 46. This differential distance corresponds to the differential cylindrical contour which must be imparted to curve 38 within shim zone $X_4$ by shim 34. For this specific dimension, shim 34 will therefore be capable of deflecting the 500 mm radius of curvature $R_{CX}$ of the underlying spherical reflector 10 to the desired smaller radius of curvature $R_{CX}=460$ mm within the shim zone $X_4$ segment. Modifying the shim thickness by the ratio of the specific rigidity factors and thicknesses of the mirror substrate and the support member reveals the proper shim thicknesses to be utilized.

By accomplishing similar measurements on a graph of the type illustrated in FIG. 4, the height or thickness of shims 30 and 32 can be readily determined.

To complete the assembly and fabrication of the toric mirror as shown in FIG. 3, the set of six paired shims 30, 32 and 34 are inserted within the interface zone 36 between first element 12 and second element 18 of spherical reflector 10 and screws 26 are tightened to equal torque values. FIG. 3E illustrates first element 12 which represents the uncompressed and undistorted conventional spherical mirror having radii of curvature $R_{CX}=R_{CY}=500$ mm. Immediately adjacent FIG. 3D illustrates first element 12 after it has been compressed against second element 18 by the compression means of the present invention in the form of the various screws and apertures described above. The dotted line designated by reference number 50 shows the uncompressed $R_{CX}=500$ mm radius of curvature of the FIG. 3E lens element. The solid line 52 illustrates the manner in which the compressive interaction between elements 12 and 18 and paired shims 30, 32 and 34 deflects the curved reflective surface of first element 12 into a second configuration where $R_{CX}=460$ mm.

It is important to note that this specific degree of mirror surface deflection from $R_{CX}=500$ mm to $R_{CX}=460$ mm occurs only in the X-axis as illustrated in the FIG. 3D sectional view. Because a shim has been omitted from shim zone $X_1$, $R_{CY}$, the radius of curvature with respect to the Y-axis, remains substantially equal to 500 mm. As illustrated by arrow 54 in FIG. 2, angular movement at a fixed radial distance from the X-axis around the Y-axis results in a varying, constantly increasing radius of curvature which equals 460 mm at the X-axis and which increases in an essentially continuous manner until a radius of curvature of 500 mm is reached at the Y-axis.

FIG. 3F represents a table of values of various shim thicknesses for use in connection with a spherical reflector having a base radius of curvature $R_C=500$ mm which is intended to be reconfigured into a toric mirror having $R_{CX}=460$ mm and $R_{CY}=500$ mm. For a spherical reflector radius of 42.5 mm, the value of the shim thickness and the respective shim zone placement of each shim is designated in FIG. 3F.

Referring now to FIGS. 5A-5E, a second embodiment of the toric mirror of the present invention is described where interface contour means in the form of a plurality of shims produces a differential cylindrical contour within interface zone 36 to produce an X-axis radius of curvature $R_{CX}$ which is greater than the Y-axis radius of curvature $R_{CY}$ where $R_{CY}$ corresponds to the base radius of curvature $R_C$ of the undeflected spherical reflector.

In the FIG. 5 embodiment of the invention, compression means in the form of apertures 16 and 24 in combination with screws 26 are oriented along the X-axis of first element 12 and second element 18. In the FIG. 3 embodiment similar structure was oriented along the Y-axis of elements 12 and 18. Such orthogonal orientation of the FIG. 5 compression means in combination with the use of a central shim 56 placed within shim zone $X_1$ together with intermediate shims 58 placed within shim zones $X_2$ and outer shims 60 placed within shim zones $X_3$ and the absence of any shims within outermost shim zone $X_4$ results in the production of an X-axis radius of curvature $R_{CX}$ which exceeds the Y-axis radius of curvature $R_{CY}$ as well as the base radius of curvature $R_C$ of the spherical reflector 12.

The shim thickness of the FIG. 5 equivalent but structurally distinct embodiment of the toric mirror invention is computed by using graphic plots of the type illustrated in FIG. 4. For the FIG. 5 embodiment of the invention, we have assumed that $R_{CX}=560$ mm and $R_{CY}=500$ mm. Corresponding curves are first graphically plotted as previously explained in connection with FIG. 4 except that the curve corresponding to the larger radius of curvature ($R_{CY}=500$ mm) would be displaced along the positive Z-axis until that curve intersected the smaller ($R_{CY}=500$ mm) curve. The thickness of central shim 56 corresponds to the Z-axis differential between the two curves where $X=0$ (the center of the two curves).

FIG. 5F represents a table of shim thickness values for a spherical reflector having a radius $r=42.5$ mm and with shim zones 10 mm wide to achieve the $R_{CX}$ and $R_{CY}$ values discussed in connection with FIGS. 3A–3D. The effects of mirror substrate and support member substrate specific rigidity factors and thicknesses have not been specifically addressed in this simplified example.

For practical reasons for both the FIG. 3 and FIG. 5 embodiments of the invention, shim thickness determinations are made according to the FIG. 4 graphic plotting process at the midpoint of each 10 mm wide shim rather than at the shim edge such as edge 62 illustrated in FIG. 3D which actually first contacts the rear surface of first element 12. This modified shim thickness computation point gives the best real world results and accommodates for elastic deformation between the edge of the shim surface and the corresponding contact point on the rear surface of first element 12. Such real world accommodations would be readily apparent to one of ordinary skill in the art in view of the detailed explanation of the structure and operation of the toric mirror invention as recited above.

Referring now to FIG. 6, another form of compression means for compressing first element 12 with respect to second element 18 to yield the desired X-axis deflection of the spherical mirror surface is disclosed to demonstrate that the compression means of the present invention is not limited to the specific hardware structure illustrated in FIGS. 3 and 5.

In the FIG. 6 embodiment of the invention, an exterior compression frame 64 grips the outer circumferential edge of first element 12 and includes a plurality of screws which are tightened to displace the interior surface of frame 64 away from the lower surface of second element 18 to exert the required compressive force between elements 12 and 18 and the interface contour means in the form of a shim or shimming surface 66 which is positioned within the interface zone between first element 12 and second element 18.

Numerous other different forms of compression means would be readily apparent to one of ordinary skill in the art to accomplish the objective of deflecting first element 12 relative to second element 18 to modify the X-axis radius of curvature of the spherical reflector without substantially modifying its Y-axis radius of curvature.

FIGS. 7A-7E illustrates a series of sectional views corresponding to a variety of different but equivalent ways of implementing the interface contour means of the present invention to produce a differential cylindrical contour within the interface zone between first element 12 and second element 18.

Figure 7A:
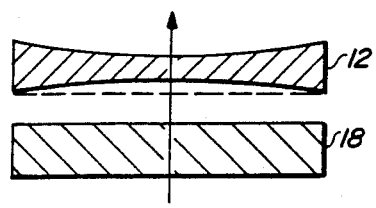
FIGS. 7A-7E disclose a variety of different interface contour devices each of which is capable of producing a differential cylindrical contour of the type required to produce a toric mirror according to the present invention.

In FIG. 7A, interface contour means in the form of shims have been omitted and instead a concave differential cylindrical contour has been configured into the lower surface of first element 12. The differential cylindrical contour of this concave surface is computed as explained above in connection with FIG. 4 for interface contour means in the form of plurality of spaced apart shims. The FIG. 7A embodiment of the invention yields a toric mirror where $R_{CX} < R_{CY}$.

Figure 7B:
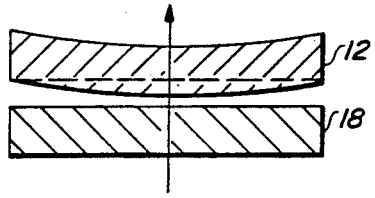

FIG. 7B illustrates an embodiment of the invention having interface contour means taking the form of a convex surface representing a differential cylindrical surface for producing a toric mirror where $R_{CX} > R_{CY}$.

Figure 7C:
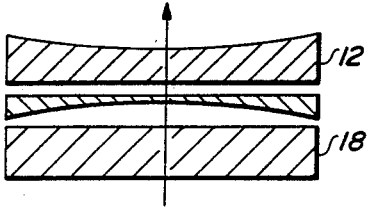

FIG. 7C represents a single piece shimming surface which is shown as including a concave surface but which could equally well be configured as a convex shimming surface. The FIG. 7C embodiment of the invention could be used in place of a plurality of spaced apart discrete shims as illustrated in FIGS. 3 and 5.

Figure 7D:
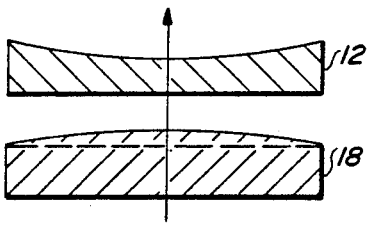

FIG. 7D illustrates yet another embodiment of the interface contour means of the present invention where the differential cylindrical surface is formed as a convex surface on the front surface of second element 18 to yield a toric mirror where $R_{CX} > R_{CY}$.

Figure 7E:
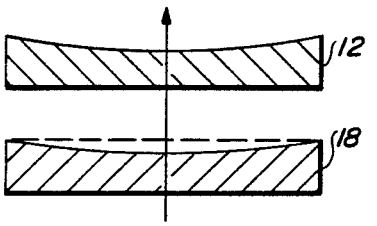

FIG. 7E represents yet another implementation of the interface contour means of the present invention where a concave cylindrical surface is formed in the front face of second element 18 to create a toric mirror having $R_{CX} < R_{CY}$.

As is clearly demonstrated by the various embodiments of the interface contour means depicted in FIG. 7, numerous other different ways of implementing the interface contour means of the present invention would be readily apparent to one of ordinary skill in the art.

Figure 8:
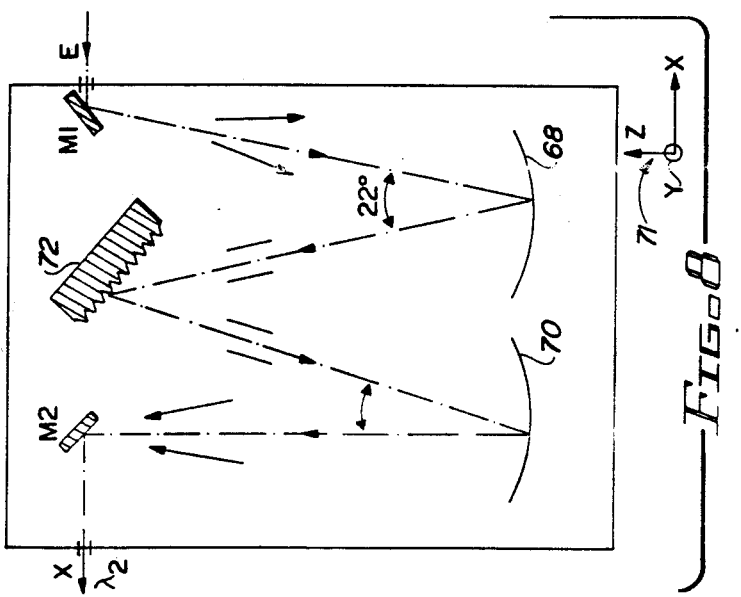
FIG. 8 is a simplified diagram of a monochromator illustrating the manner in which a toric mirror according to the present invention may be incorporated as the collimating and focussing mirrors.

FIG. 8 illustrates the application of toric mirrors of the present invention as the collimating mirror 68 and/or focussing mirror 70 of a prior art monochromator such as a Czerny-Turner or Ebert monochromator. The X, Y, Z axis chart designated by reference number 70 shows the correspondence between the X, Y and Z axes of the FIG. 8 monochromator to the toric mirror axes as has been uniformly described in connection with the various figures such as FIGS. 3, 4 and 5.

In one specific embodiment of a monochromator using toric mirrors of the present invention, collimating mirror 68 and focussing mirror 70 are selected to have the following radii of curvature:

TABLE I

| RADIUS OF CURVATURE | COLLIMATING MIRROR | FOCUSSING MIRROR |
|---|---|---|
| $R_{CX}$ | 500 mm | 500 mm |
| $R_{CY}$ | 565 mm | 460 mm |

In the FIG. 8 embodiment of the invention, the distance between the entrance slit "E", mirror "$M_1$" and collimating mirror 68 equal 250 mm. The distance between exit slit "X," mirror "$M_2$" and focussing mirror 70 was equals 260 mm.

Mirrors 68 and 70 in the FIG. 8 monochromator application could have been fabricated in a variety of ways. The $R_{CY}$ radius of curvature of collimating mirror 68 may either be produced by outwardly deflecting a base spherical reflector with $R_C = 500$ mm to achieve $R_{CY} = 565$ mm. Alternatively, a base spherical reflector with $R_C = 565$ could have been used and inwardly deflected along the X-axis to yield $R_{CX} = 500$ mm. Focussing mirror 70 could also be produced by means of either technique. It has been found by actual practice of the invention that the inward deflection technique as depicted in FIG. 3 produces the most accurate toric mirror surface configuration.

In the FIG. 8 embodiment of the invention with the monochromator parameters recited above, a deflection angle of 22° exists between mirror $M_1$, collimating mirror 68 and diffraction grating 72. The extraordinarily high precision characteristics of the toric mirror of the present invention enable it to operate at such extraordinarily low distortion levels that it can accommodate this unusually wide angle without producing significant aberration or astigmatism.

Figure 9:
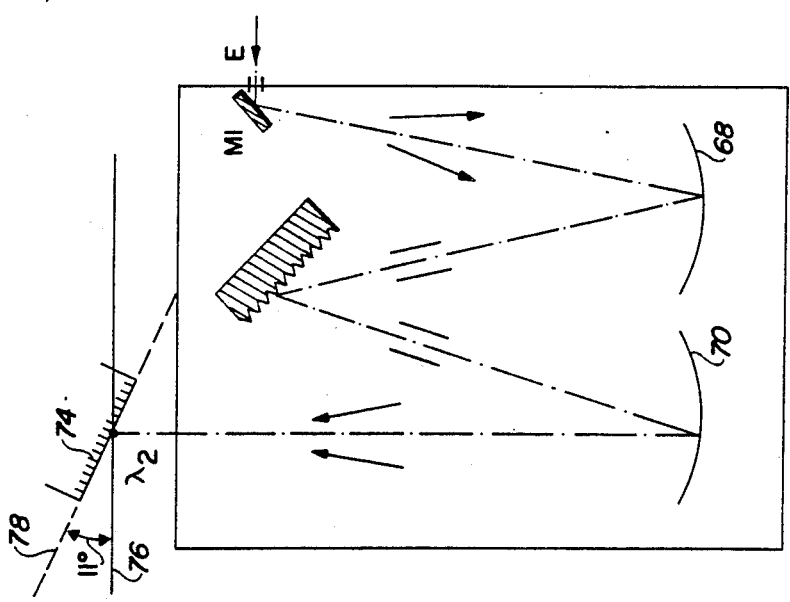
FIG. 9 represents a simplified diagram of a first configuration spectrograph having both diverging and converging internal light beams where toric mirrors according to the present invention are utilized as collimating and focussing mirrors.

Referring now to FIG. 9, the toric mirror of the present invention is shown configured as the collimating mirror 68 and focussing mirror 70 in a spectrograph which focusses an output wavelength $\lambda_2$ on a diode array 74.

Although with prior art devices the spectrograph output is typically focussed on an image plane 76 which is orthogonal to the output wave length $\lambda_2$, the unique toric structure of the mirrors of the present invention yields an output beam which focusses upon an image plane 78 which is inclined at an 11° angle to orthogonal image plane 76. As output beam $\lambda_2$ is laterally deflected to the left and right with respect to image plane 78, the focal length of the spectrograph increases and decreases as a result of this 11° angle of inclination.

TABLE II

MONOCHROMATOR/SPECTROGRAPH MIRROR ORIENTATION

| PERFORMANCE RATING | COLLIMATING MIRROR | FOCUSSING MIRROR |
|---|---|---|
| Excellent | $R_Y > R_X$ | $R_Y < R_X$ |
| Poor | $R_Y < R_X$ | $R_Y > R_X$ |
| Inoperative | $R_Y > R_X$ | $R_Y > R_X$ |
| Inoperative | $R_Y < R_X$ | $R_Y < R_X$ |

The relative optical performance of the toric mirror of the present invention has been calculated by appropriate optical computer software and can be compared as to various performance parameters to optical performance of high quality spherical mirrors. Table III below compares selected calculated optical performance parameters for the toric mirror of the present invention to the performance parameters of a high quality conventional spherical mirror.

Figure 10:
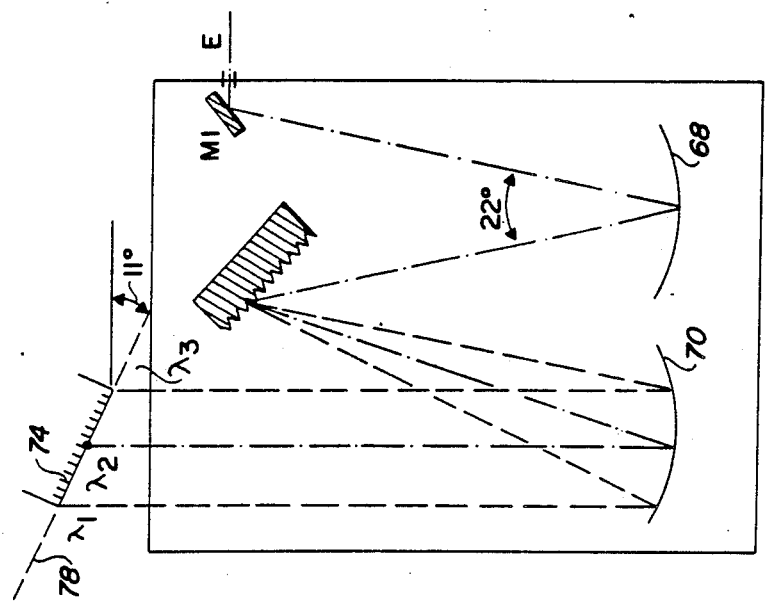
FIG. 10 represents an expanded diagram of the FIG. 9 spectrograph showing the spread of wavelengths which are brought to focus on the diode array 74.

Referring now to FIG. 10, the toric mirror of the present invention is shown configured as the collimating mirror 68 and focussing mirror 70 in a spectrograph which focusses a series of output wavelengths on diode array 74. Once again, the spectrograph output beam forms a focussed image on image plane 78 with an 11° angle of inclination with respect to an orthogonal output plane.

For either the monochromator or spectrograph applications of the toric mirror of the present invention, specific mirror axis orientations have found to work very well while other minor axis orientations have been found to be inoperative. Table II below indicates the performance ratings for various orientations of collimating mirror 68 and focussing mirror 70.

TABLE II

MONOCHROMATOR/SPECTROGRAPH MIRROR ORIENTATION

| PERFORMANCE RATING | COLLIMATING MIRROR | FOCUSSING MIRROR |
|---|---|---|
| Excellent | $R_Y > R_X$ | $R_Y < R_X$ |
| Poor | $R_Y < R_X$ | $R_Y > R_X$ |
| Inoperative | $R_Y > R_X$ | $R_Y > R_X$ |
| Inoperative | $R_Y < R_X$ | $R_Y < R_X$ |

The relative optical performance of the toric mirror of the present invention has been calculated by appropriate optical computer software and can be compared as to various performance parameters to the optical performance of high quality spherical mirrors. Table III below compares selected calculated optical performance parameters for the toric mirror of the present invention to the performance parameters of a high quality conventional spherical mirror.

TABLE III

RELATIVE OPTICAL PERFORMANCE OF TORIC MIRROR

| OPTICAL PARAMETER | SPHERICAL MIRROR (mm) | TORIC MIRROR (Calculated in mm) |
|---|---|---|
| Spherical Aberration (X, Y) | 0.64 | 0 |
| Coma (Y) | 1.10 | 0 |
| Astigmatism (X,Y) | 0.065 | 0.058 |
| Radius of Curvature | r = 500 | r = Various (defined in Table II) |

The calculated performance parameters of the toric mirror of the present invention indicate an approximate 1100% superiority relative to conventional mirror systems. Assuming that the actual performance characteristics determined by measurement would be approximately 50% of the calculated performance characteristics, it may be conservatively assumed that the toric mirror of the present invention will yield optical results improved by a factor of from 500% to 600% in comparison to spherical mirrors.

The X-axis radius of curvature $R_{CX}$ of the toric mirror of the present invention may be "tuned" within a limited range by either increasing or decreasing the torque imparted to screws 16 and/or by changing shim thickness. Small adjustments in the screw torque level permit various parts of the toric mirror surface to be adjusted within a limited range or tweaked to optimize the optical performance of that mirror in a particular application. The use of compression means in the form of a series of finely threaded screws in combination with high rigid first and second elements yields a highly stable toric mirror surface which will not be adversely affected by vibration, temperature, age or other external environmental variables. Once the toric mirror surface is initially adjusted during original manufacture, it should not normally need to be readjusted or realigned in use.

In the foregoing description, first element 12 was described as being fabricated from aluminum with a thickness of one half inch while second element 18 was described as being fabricated from steel with a thickness of one half inch. Alternatively, the desired increased rigidity factor of second element 18 relative to first element 12 may be realized by utilizing aluminum but with an increased thickness, such as one inch thickness, for second element 18 to achieve the desired enhanced rigidity of second element 18 with respect to first element 12.

In another alternative embodiment, first element 12 and second element 18 may both be fabricated from aluminum with equal thicknesses of one half inch. In this distinct embodiment, both the first and second elements deflect about the X-axis in equal but opposite amounts in response to the differential cylindrical contour imparted by the interface contour means. The resulting change in $R_{CX}$ resulting from the interface contour means will therefore be only half as great as when a rigid steel element is used as element 18. With appropriate design considerations, a function equivalent to the desired control)ed bending or deflection of the reflective surface of first element 12 can be achieved with this embodiment of the invention even though the rigidity factors of first element 12 and second element 18 are equal.

It will be apparent to those skilled in the art that the disclosed toric mirror may be modified in numerous ways and may assume many embodiments other than the preferred forms specifically set out and described above. In addition, the toric mirror may be used in many applications other than the monochromator and spectrograph applications depicted and described in connection with FIGS. 8-10. The FIG. 4 measurement techniques may be easily and quickly accomplished by a digital computer. Accordingly, it is intended by the appended claims to cover all such modifications of the invention which fall within the true spirit and scope of the invention.

I claim:

1. A toric mirror comprising:
   a. a first element having a front surface defining a spherical reflector and a spaced apart rear surface, the spherical reflector including a constant radius of curvature, an X-axis with an Y-axis radius of curvature, a Y-axis with a Y-axis radius of curvature and a Z-axis, the first element being fabricated to possess a first rigidity factor;
   b. a second element having a front surface sized to mate with the rear surface of the first element along an interface zone, the second element being fabricated to possess a second rigidity factor;
   c. interface contour means for producing a differential cylindrical contour within the interface zone between the first and second elements, the interface contour means being aligned to modify the X-axis radius of curvature of the spherical reflector without substantially modifying the Y-axis radius curvature; and
   d. compression means for compressing the first and second elements together to deflect the first element relative to the second element to modify the X-axis radius of curvature of the spherical reflector without substantially modifying its Y-axis radius of curvature to thereby yield a toric mirror having a modified X-axis radius of curvature determined by the interface contour means and a substantially unchanged Y-axis radius of curvature.

2. The toric mirror of claim 1 wherein the second rigidity factor is greater than the first rigidity factor of the first element.

3. The toric mirror of claim 2 wherein the interface contour means is configured to decrease the X-axis radius of curvature relative to the Y-axis radius of curvature.

4. The toric mirror of claim 3 wherein the spherical reflector includes a center and an edge surface, wherein the differential cylindrical contour of the interface contour means includes a variable thickness, and wherein the thickness of the interface contour means reaches a minimum in proximity to the center of the spherical reflector and reaches a maximum in proximity to the edge of the spherical reflector.

5. The toric mirror of claim 4 wherein the compression means exerts a compressive force between the first and second elements along the Y-axis of the spherical reflector.

6. The toric mirror of claim 4 wherein the rear surface of the first element includes a flat rear surface oriented parallel to the plane defined by the intersection of the X and Y axes of the first element, wherein the second element includes a flat rear surface, wherein the front surface of the second element is oriented parallel to the rear surface of the second element, and wherein the interface contour means includes a shim surface.

7. The toric mirror of claim 6 wherein the shim surface includes a plurality of parallel oriented, spaced apart shims.

8. The toric mirror of claim 7 wherein each shim includes a central axis and wherein the central axis of each shim is oriented parallel to the Y-axis.

9. The toric mirror of claim 8 wherein each shim includes a rectangular cross section.

10. The toric mirror of claim 9 wherein each shim includes laterally spaced apart first and second side surfaces and wherein the side surface of each shim contacts the side surface of an adjacent shim.

11. The toric mirror of claim 2 wherein the first and second elements each possess a predetermined thickness, wherein the first and second elements are fabricated from the same material, and wherein the thickness of the second element exceeds the thickness of the first element.

12. The toric mirror of claim 11 wherein the first and second elements are fabricated from aluminum.

13. The toric mirror of claim 11 wherein the first and second elements are fabricated from steel.

14. The toric mirror of claim 2 wherein the first element is fabricated from a first material and the second element is fabricated from a second material and wherein the rigidity factor of the second material is greater than the rigidity factor of the first material.

15. The toric mirror of claim 14 wherein the first element includes a first thickness, the second element includes a second thickness and wherein the thickness of the first and second elements are not substantially different.

16. The toric mirror of claim 15 wherein the first element is fabricated from aluminum and wherein the second element is fabricated from steel.

17. The toric mirror of claim 14 wherein the first element is fabricated from aluminum and wherein the second is fabricated from steel.

18. The toric mirror of claim 2 wherein the interface contour means is configured to increase the X-axis radius of curvature relative to the Y-axis radius of curvature.

19. The toric mirror of claim 18 wherein the spherical reflector includes a center and an edge surface, wherein the differential cylindrical contour of the interface contour means includes a variable thickness, and wherein the thickness of the interface contour means reaches a minimum in proximity to the edge surface of the spherical reflector and a maximum in proximity to the center of the spherical reflector.

20. The toric mirror of claim 19 wherein the compression means exerts a compressive force between the first and second elements along the X-axis of the spherical reflector.

21. The toric mirror of claim 20 wherein the rear surface of the first element includes a flat rear surface oriented parallel to the plane defined by the intersection of the X and Y axes, wherein the second element includes a flat rear surface, wherein the front surface of the second element is positioned parallel to the rear surface of the second element, and wherein the interface contour means includes a shim surface.

22. The toric mirror of claim 21 wherein the shim surface includes a plurality of parallel oriented, spaced apart shims.

23. The toric mirror of claim 22 wherein each shim includes a central axis and wherein the central axis of each shim is oriented parallel to the Y-axis.

24. The toric mirror of claim 23 wherein each shim includes a rectangular cross section.

25. The toric mirror of claim 24 wherein each shim includes laterally spaced apart first and second side surfaces and wherein the side surface of each shim contacts the side surface of an adjacent shim.

26. The toric mirror of claim 2 wherein the compression means consists of a plurality of spaced apart screws extending between and securing together the first and second elements.

27. The toric mirror of claim 26 wherein the X-axis radius of curvature of the spherical reflector is modified to be less than its Y-axis radius of curvature and wherein the plurality of spaced apart screws are positioned at spaced apart intervals along the Y-axis.

28. The toric mirror of claim 26 wherein the X-axis radius of curvature is modified to be greater than the Y-axis radius of curvature and wherein the plurality of spaced apart screws are positioned at spaced apart intervals along the X-axis.

29. The toric mirror of claim 2 wherein the second element includes a rear surface oriented parallel to the its front surface, and wherein the differential cylindrical contour of the interface contour means is formed on the rear surface of the first element.

30. The toric mirror of claim 29 wherein the rear surface of the first element is formed as a convex surface to produce an X-axis radius of curvature greater than the Y-axis radius of curvature.

31. The toric mirror of claim 29 wherein the rear surface of the first element is formed as a concave surface to produce an X-axis radius of curvature less than the Y-axis radius of curvature.

32. The toric mirror of claim 29 wherein the rear surface of the first element is oriented parallel to the plane defined by the intersection of the X and Y axes and wherein the front surface of the second element includes a convex surface to produce an X-axis radius of curvature greater than the Y-axis radius of curvature.

33. The toric mirror of claim 29 wherein the rear surface of the first element is oriented parallel to the plane formed by the intersection of the X and Y axes and wherein the front surface of the second element includes a concave surface to produce a X-axis radius of curvature less than the Y-axis radius of curvature.

34. In a monochromator wherein the improvement comprises:
   a. a collimating mirror including
      i. a first element having a front surface defining a spherical reflector and a spaced apart rear surface, the spherical reflector including a constant radius of curvature, an X-axis with an X-axis radius of curvature, a Y-axis with a Y-axis radius of curvature and a Z-axis, the first element being fabricated to possess a first rigidity factor;
      ii. a second element having a front surface sized to mate with the rear surface of the first element along an interface zone, the second element being fabricated to possess a second rigidity factor greater than the first rigidity factor of the first element;
      iii. interface contour means for producing a differential cylindrical contour within the interface zone between the first and second elements, the interface contour means being aligned to modify the X-axis radius of curvature of the spherical reflector without substantially modifying the Y-axis radius curvature; and
      iv. compression means for compressing the first and second elements together to deflect the first element relative to the second element to modify the X-axis radius of curvature of the spherical reflector without substantially modifying its Y-axis radius of curvature to thereby yield a toric mirror having a modified X-axis radius of curvature determined by the interface contour means and a substantially unchanged Y-axis radius of curvature.

35. In a monochromator wherein the improvement comprises:
   a. a collimating mirror including
      i. a first element having a front surface defining a spherical reflector and a spaced apart rear surface, the spherical reflector including a constant radius of curvature, an X-axis with an X-axis radius of curvature, a Y-axis with a Y-axis radius of curvature and a Z-axis, the first element being fabricated to possess a first rigidity factor;
      ii. a second element having a front surface sized to mate with the rear surface of the first element along an interface zone, the second element being fabricated to possess a second rigidity factor greater than the first rigidity factor of the first element;
      iii. interface contour means for producing a differential cylindrical contour within the interface zone between the first and second elements, the interface contour means being aligned to modify the X-axis radius of curvature of the spherical reflector without substantially modifying the Y-axis radius curvature; and
      iv. compression means for compressing the first and second elements together to deflect the first element relative to the second element to modify the X-axis radius of curvature of the spherical reflector without substantially modifying its Y-axis radius of curvature to thereby Yield a toric mirror having a modified X-axis radius of curvature determined by the interface contour means and a substantially unchanged Y-axis radius of curvature; and
   b. a focussing mirror including
      i. a first element having a front surface defining a spherical reflector and a spaced apart rear surface, the spherical reflector including a constant radius of curvature, an X-axis with an X-axis radius of curvature, a Y-axis with a Y-axis radius of curvature and a Z-axis, the first element being fabricated to possess a first rigidity factor;
      ii. a second element having a front surface sized to mate with the rear surface of the first element along an interface zone, the second element being fabricated to possess a second rigidity factor greater than the first rigidity factor of the first element;
      iii. interface contour means for producing a differential cylindrical contour within the interface zone between the first and second elements, the interface contour means being aligned to modify the X-axis radius of curvature of the spherical reflector without substantially modifying the Y-axis radius curvature; and
      iv. compression means for compressing the first and second elements together to deflect the first element relative to the second element to modify the X-axis radius of curvature of the spherical reflector without substantially modifying its Y-axis radius of curvature to thereby yield a toric mirror having a modified X-axis radius of curvature determined by the interface contour means and a substantially unchanged Y-axis radius of curvature.

36. In a spectrograph wherein the improvement comprises:
   a. a collimating mirror including
      i. a first element having a front surface defining a spherical reflector and a spaced apart rear surface, the spherical reflector including a constant radius of curvature, an X-axis with an X-axis radius of curvature, a Y-axis with a Y-axis radius of curvature and a Z-axis, the first element being fabricated to possess a first rigidity factor;
      ii. a second element having a front surface sized to mate with the rear surface of the first element along an interface zone, the second element being fabricated to possess a second rigidity factor greater than the first rigidity factor of the first element;
      iii. interface contour means for producing a differential cylindrical contour within the interface zone between the first and second elements, the interface contour means being aligned to modify the X-axis radius of curvature of the spherical reflector without substantially modifying the Y-axis radius curvature; and
      iv. compression means for compressing the first and second elements together to deflect the first element relative to the second element to modify the X-axis radius of curvature of the spherical reflector without substantially modifying its Y-axis radius of curvature to thereby yield a toric mirror having a modified X-axis radius of curvature determined by the interface contour means and a substantially unchanged Y-axis radius of curvature.

37. In a spectrograph wherein the improvement comprises:
   a. a collimating mirror including
      i. a first element having a front surface defining a spherical reflector and a spaced apart rear surface, the spherical reflector including a constant radius of curvature, an X-axis with an X-axis radius of curvature, a Y-axis with a Y-axis radius of curvature and a Z-axis, the first element being fabricated to possess a first rigidity factor;

ii. a second element having a front surface sized to mate with the rear surface of the first element along an interface zone, the second element being fabricated to possess a second rigidity factor greater than the first rigidity factor of the first element;

iii. interface contour means for producing a differential cylindrical contour within the interface zone between the first and second elements, the interface contour means being aligned to modify the X-axis radius of curvature of the spherical reflector without substantially modifying the Y-axis radius curvature; and iv. compression means for compressing the first and second elements together to deflect the first element relative to the second element to modify the X-axis radius of curvature of the spherical reflector without substantially modifying its Y-axis radius of curvature to thereby yield a toric mirror having a modified X-axis radius of curvature determined by the interface contour means and a substantially unchanged Y-axis radius of curvature; and b. a focussing mirror including i. a first element having a front surface defining a spherical reflector and a spaced apart rear surface, the spherical reflector including a constant radius of curvature, an X-axis with an X-axis radius of curvature, a Y-axis with a Y-axis radius of curvature and a Z-axis, the first element being fabricated to possess a first rigidity factor;

ii. a second element having a front surface sized to mate with the rear surface of the first element along an interface zone, the second element being fabricated to possess a second rigidity factor greater than the first rigidity factor of the first element;

iii. interface contour means for producing a differential cylindrical contour within the interface zone between the first and second elements, the interface contour means being aligned to modify the X-axis radius of curvature of the spherical reflector without substantially modifying the Y-axis radius curvature; and iv. compression means for compressing the first and second elements together to deflect the first element relative to the second element to modify the X-axis radius of curvature of the spherical reflector without substantially modifying its Y-axis radius of curvature to thereby yield a toric mirror having a modified X-axis radius of curvature determined by the interface contour means and a substantially unchanged Y-axis radius of curvature.

38. A method for making a toric mirror comprising the steps of:

a. providing a first element having a front surface defining a spherical reflector and a spaced apart rear surface, the spherical reflector including a constant radius of curvature, an X-axis with an X-axis radius of curvature, a Y-axis with a Y-axis radius of curvature and a Z-axis, the first element being fabricated to possess a first rigidity factor;

b. providing a second element having a front surface sized to mate with the rear surface of the first element along an interface zone, the second element being fabricated to possess a second rigidity factor;

c. creating a differential cylindrical contour within the interface zone between the first and second elements, the cylindrical contour being aligned to modify the X-axis radius of curvature of the spherical reflector without substantially modifying the Y-axis radius of curvature; and d. compressing the first and second elements together to deflect the first element relative to the second element to modify the X-axis radius of curvature of the spherical reflector without substantially modifying its Y-axis radius of curvature to thereby yield a toric mirror having a modified X-axis radius of curvature determined by the interface contour means and a substantially unchanged Y-axis radius of curvature.

39. The method of claim 38 wherein the second rigidity factor is greater than the first rigidity factor.

40. The method of claim 39 wherein the cylindrical contour is configured to decrease the X-axis radius of curvature relative to the Y-axis radius of curvature.

41. The method of claim 40 wherein the spherical reflector includes a center and an edge surface, wherein the differential cylindrical contour includes a variable thickness, and wherein the thickness of the cylindrical contour reaches a minimum in proximity to the center of the spherical reflector and reaches a maximum in proximity to the edge of the spherical reflector.

42. The method of claim 41 wherein the compression step is accomplished by exerting compressive forces between the first and second elements along the Y-axis of the spherical reflector.

43. The method of claim 39 wherein the cylindrical contour is configured to increase the X-axis radius of curvature relative to the Y-axis radius of curvature.

44. The method of claim 43 wherein the spherical reflector includes a center and an edge surface, wherein the differential cylindrical contour includes a variable thickness, and wherein the thickness of the cylindrical contour reaches a minimum in proximity to the edge surface of the spherical reflector and a maximum in proximity to the center of the spherical reflector.

45. The method of claim 44 wherein the compression step is accomplished by exerting compressive force between the first and second elements along the X-axis of the spherical reflector.

46. The method of claim 39 wherein the compression step is accomplished by extending a plurality of screws between the first and second elements at spaced apart intervals to secure and tighten together the first and second elements.

47. The method of claim 46 wherein the X-axis radius of curvature of the spherical reflector is modified to be less than the Y-axis radius of curvature and wherein the plurality of spaced apart screws are positioned at spaced apart intervals along the Y-axis.

48. The method of claim 46 wherein the X-axis radius of curvature is modified to be greater than the Y-axis radius of curvature and wherein the plurality of spaced apart screws are positioned at spaced apart intervals along the Y-axis.

* * * * *